US009495857B2

(12) United States Patent
Nike

(10) Patent No.: US 9,495,857 B2
(45) Date of Patent: Nov. 15, 2016

(54) CONTROL DISPLAY OF APPLICATIONS FROM A MOBILE DEVICE COMMUNICABLY CONNECTED TO AN IN-VEHICLE APPARATUS DEPENDING ON SPEED-THRESHOLD

(71) Applicant: DENSO CORPORATION, Kariya, Aichi-pref. (JP)

(72) Inventor: Martin Nike, Coventry (GB)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/403,534

(22) PCT Filed: May 27, 2013

(86) PCT No.: PCT/JP2013/003324
§ 371 (c)(1),
(2) Date: Nov. 24, 2014

(87) PCT Pub. No.: WO2013/179632
PCT Pub. Date: Dec. 5, 2013

(65) Prior Publication Data
US 2015/0254960 A1    Sep. 10, 2015

(30) Foreign Application Priority Data

May 31, 2012 (GB) .................................. 1209712.7

(51) Int. Cl.
*B60Q 1/00* (2006.01)
*G08B 21/18* (2006.01)
(Continued)

(52) U.S. Cl.
CPC .............. *G08B 21/182* (2013.01); *G08B 5/36* (2013.01); *H04M 1/6075* (2013.01); *H04M 1/72569* (2013.01); *H04M 1/72577* (2013.01)

(58) Field of Classification Search
CPC ................... G08B 21/182; G08B 5/36; H04M 1/6075; H04M 1/72569; H04M 1/72577; H04W 4/04; H04W 4/046
(Continued)

(56) References Cited

U.S. PATENT DOCUMENTS 5,838,251 A * 11/1998 Brinkmeyer ............ B60R 25/04
307/10.2
6,188,315 B1 * 2/2001 Herbert ............... B60R 16/0232
340/438

(Continued)

FOREIGN PATENT DOCUMENTS

EP         2254034 A2     11/2010
JP       2000-196986       7/2000

(Continued)

OTHER PUBLICATIONS

International Search Report and Written Opinion for PCT/JP2013/003324, mailed Oct. 4, 2013; ISA/EP.

(Continued)

*Primary Examiner* — Daniel Previl
(74) *Attorney, Agent, or Firm* — Harness, Dickey & Pierce, P.L.C.

(57) ABSTRACT

An in-vehicle apparatus communicably connected to a mobile device and located in a vehicle includes a display screen displaying data related to applications of the mobile device in communication with the mobile device; a memory storing an application record including identification informations of the applications, each application being associated with one or more mobile device models; a communication unit operable to receive model information data from the mobile device; and a control unit. The control unit i) receives a signal indicating a vehicle speed; ii) retrieves, from the memory, the identification informations of the applications included in the application record based on the (Continued)

model information data; and iii) controls the display of the data related to predetermined applications for which identification informations were retrieved from the memory on the display screen when the speed of the vehicle exceeds a predetermined speed threshold.

31 Claims, 3 Drawing Sheets

(51) Int. Cl.
  *H04M 1/60* (2006.01)
  *H04M 1/725* (2006.01)
  *G08B 5/36* (2006.01)

(58) Field of Classification Search
  USPC .......... 340/441, 426.24, 438, 444, 447, 466, 340/471, 511, 539.19, 539.22, 539.26, 586
  See application file for complete search history.

(56) References Cited

U.S. PATENT DOCUMENTS

| | | | |
|---|---|---|---|
| 6,243,685 B1* | 6/2001 | Welch | B60Q 1/503 340/426.24 |
| 6,549,958 B1* | 4/2003 | Kuba | G06F 13/4081 710/14 |
| 2002/0197955 A1* | 12/2002 | Witkowski | G07C 5/008 455/41.1 |
| 2006/0168627 A1 | 7/2006 | Zeinstra et al. | |
| 2007/0111710 A1 | 5/2007 | Pietruszka et al. | |
| 2010/0216509 A1 | 8/2010 | Riemer et al. | |
| 2010/0295803 A1 | 11/2010 | Kim et al. | |
| 2011/0009107 A1* | 1/2011 | Guba | G08G 1/20 455/418 |
| 2011/0060496 A1* | 3/2011 | Nielsen | G06Q 10/0631 701/31.4 |
| 2012/0095643 A1* | 4/2012 | Bose | B60K 37/00 701/32.8 |
| 2013/0275899 A1* | 10/2013 | Schubert | G06F 3/0481 715/765 |

FOREIGN PATENT DOCUMENTS

| | | |
|---|---|---|
| JP | 2008-003826 | 1/2008 |
| JP | 2009-281991 | 12/2009 |
| JP | 2009281991 A | 12/2009 |
| JP | 2010-047235 | 3/2010 |
| JP | 2010-126143 | 6/2010 |
| WO | WO-2004086735 A1 | 10/2004 |

OTHER PUBLICATIONS

Office Action dated Oct. 6, 2015 in corresponding Japanese Application No. 2014-549262.

* cited by examiner

CONTROL DISPLAY OF APPLICATIONS FROM A MOBILE DEVICE COMMUNICABLY CONNECTED TO AN IN-VEHICLE APPARATUS DEPENDING ON SPEED-THRESHOLD

CROSS REFERENCE TO RELATED APPLICATION APPLICATIONS

This application is a U.S. National Phase Application under 35 U.S.C. 371 of International Application No. PCT/JP2013/003324 filed on May 27, 2013 and published in English as WO 2013/179632 A1 on Dec. 5, 2013. This application is based on and claims the benefit of priority from Great Britain Patent Application No. 1209712.7 filed on May 31, 2012. The entire disclosures of all of the above applications are incorporated herein by reference.

TECHNICAL FIELD

The present disclosure relates generally to an in-vehicle apparatus, a vehicle, and a method for an in-vehicle apparatus.

BACKGROUND ART

Vehicles may allow a user to connect or pair their mobile device, e.g., a mobile phone, with an in-vehicle device to allow the user to gain access to the mobile device via the in-vehicle device. For example, the user is able to make calls from their mobile phone, which is controlled by the in-vehicle device. Furthermore, some vehicles are fitted with hands-free systems that allow the user to use their mobile phone while driving without having to remove their hands from the controls of the vehicle. Additionally, other devices may be connected to the in-vehicle device, for example, a mobile device that allows the user to play-back music stored in the mobile device through a sound system of the vehicle. The user may also be able to control the mobile device using the in-vehicle device.

JP 2009-281991 A describes an in-vehicle apparatus that stores a table defining relationship between a driving status, information type (e.g. video or picture) and display status for displaying the data generated by a digital device. The apparatus provides a user with a display status that is suitable for the current driving condition. For example, when a vehicle is being driven at high speed, and the information type is video, the apparatus turns to a non-display mode. However, mobile devices that might be paired with the in-vehicle apparatus have a variety of different specifications and the control of the display based on the vehicle speed is dependent on the vehicle specification.

SUMMARY

Viewed from a first aspect there can be provided an approach which allows an in-vehicle apparatus to control an output from a mobile device connected to the in-vehicle apparatus to a display of the vehicle based upon a current speed of the vehicle and a classification category of the connected mobile device. Thus the ability to replicate some or all of a display from the connected mobile device can be suspended for a given type or class of mobile device when a vehicle reaches a speed threshold. In some examples, the controlled output is a terminal mode output of a connected smart phone.

Viewed from another aspect, there can be provided an in-vehicle apparatus, which is located in a vehicle and is communicably connected to a mobile device, comprising: a display screen configured to display data related to a plurality of applications of the mobile device in communication with the mobile device; a memory configured to store an application record in which an identification information of a predetermined application is stored associated the mobile device, the predetermined application being one of the applications of the mobile device; a communication unit operable to receive, from the mobile device, a model information data of the mobile device; and a control unit operable to: receive a signal indicative of the speed of the vehicle; retrieve, from the memory, the identification information of the predetermined application included in the application record based on the model information data received from the mobile device; and control a display of the data related to the predetermined application on the display screen when the speed of the vehicle exceeds a predetermined speed threshold, the predetermined application being identified by the identification information retrieved from the memory. Thus, speed and device model selective control of mobile device-originating display data can be effected. That is, a display of the data related to the predetermined application is controlled based on the speed of the vehicle by storing the predetermined application in the application record.

In some examples, the memory may store the predetermined speed threshold. Thus, the speed threshold can be conveniently accessed.

In some examples, the predetermined speed threshold and the application record may be separately stored in different areas of the memory. Thus, updates to either data set can be performed independently of the other, thus providing for updates based upon a device model release or alteration and updates based upon a vehicle preference alteration to be performed independently.

In some examples, the display on the display screen of the predetermined application identified by the retrieved identification information may be permitted when the detected speed of the vehicle exceeds the predetermined speed threshold. Thus a pass list of allowed applications for high speed travel can be provided.

In some examples, the display on the display screen of the predetermined application identified by the retrieved identification information may be prohibited when the detected speed of the vehicle exceeds the predetermined speed threshold. Thus a stop list of disallowed applications for high speed travel can be provided.

In some examples, the control unit may be operable to generate a control signal for the mobile device. The control signal includes instructions for the mobile device to control a transmission of the data related to the predetermined application from the mobile device to the in-vehicle apparatus. Thus control of display output is achieved by controlling the source of the display signals.

In some examples, the control unit may be operable to check the data received from the mobile device to determine the identification information of the predetermined application in the data related to the predetermined application. Thus control of display output is achieved by intercepting a display signal received from the mobile device.

In some examples, the apparatus may further comprise a speed detection unit operable to detect the speed of the vehicle. Thereby the apparatus can directly obtain a vehicle speed.

In some examples, the predetermined speed threshold may be associated with the mobile device. Thus a speed-based application control can be performed on a per mobile device basis.

In some examples, the memory may store a plurality of predetermined speed thresholds, one threshold for each mobile device model or for a group of mobile device models. Thereby different mobile devices can be subjected to application control at different vehicle speeds. Further, different mobile devices can be subjected to application control at the same vehicle speed.

In some examples, the communication unit may be operable to transmit the control signal to the mobile device and receive the data related to the predetermined application from the mobile device. Thus remote application control can be provided for controlling the application of the mobile device.

In some examples, the predetermined application may be a terminal mode application. Thereby all display output from the mobile device can be conveniently uniformed.

In some examples, different applications identified in the application record may be associated with different predetermined speed thresholds. Thereby different applications can be subjected to control at different vehicle speeds.

Viewed from another aspect there can be provided a vehicle comprising the above apparatus.

Viewed from a further aspect there can be provided a method for an in-vehicle apparatus comprising: storing a record of a plurality of applications as an application record, each of the applications being associated with one or more mobile devices; receiving a signal indicative of a speed of a vehicle in which the in-vehicle apparatus is located; receiving model information data from the mobile device; retrieving identification information for at least one of the applications included in the application record associated with the mobile device based on the model information data; and controlling a display of data on a display screen of the in-vehicle apparatus when the speed of the vehicle exceeds a predetermined speed threshold, the data to be displayed on the display screen of the in-vehicle apparatus being related to the at least one of the applications, which is identified by the identification information. Thus, speed and device model selective control of mobile device-originating display data can be effected. That is, the display of the data related to the at least one of the applications is controlled based on the speed of the vehicle by storing the application in the application record.

Viewed from another aspect there can be provided a computer program product comprising processor implementable instructions for causing a programmable device to carry out the above method and/or to become configured as the above apparatus.

Further feature combinations provided by the present teachings will be understood from the following detailed description and the accompanying figures.

BRIEF DESCRIPTION OF DRAWINGS

The present teachings will now be described by way of example only and with reference to the following drawings in which like numerals reflect like elements.

DESCRIPTION OF EMBODIMENTS

Figure 1:
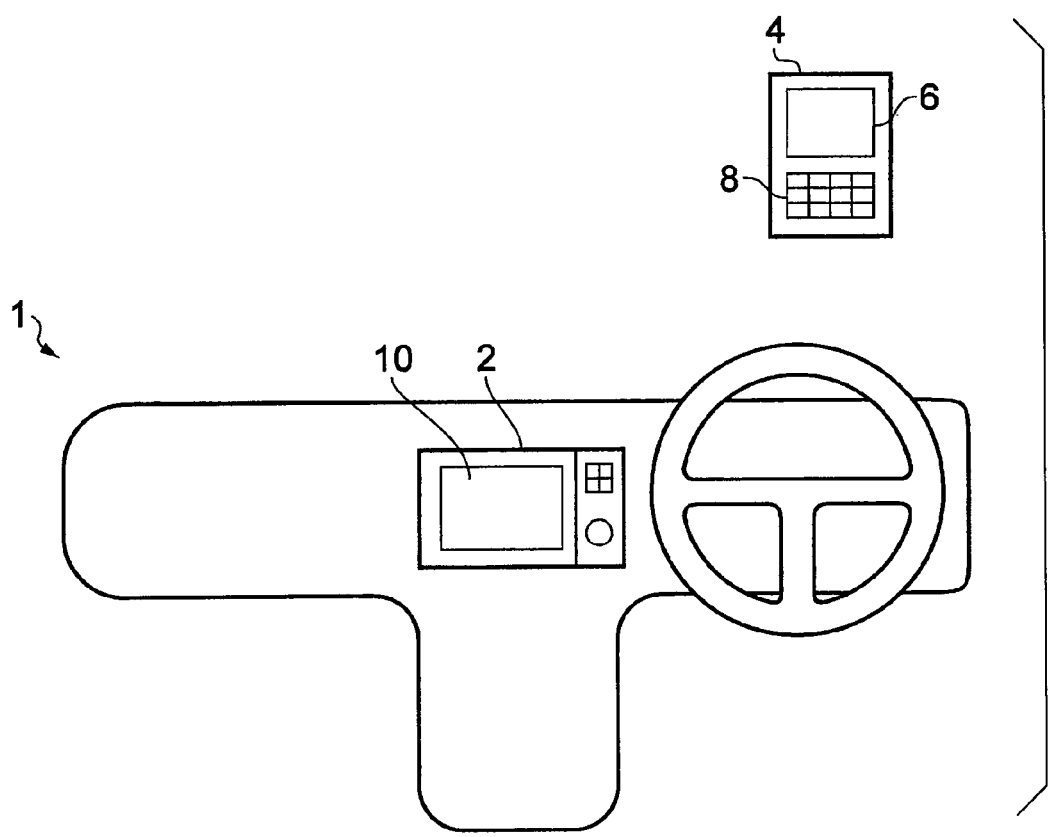
FIG. 1 is a schematic diagram showing an in-vehicle apparatus and a mobile device according to an embodiment of the present disclosure.

While the present disclosure is susceptible to various modifications and alternative forms, specific embodiments are shown by way of example in the drawings and are herein described in detail. It should be understood however that drawings and detailed description attached hereto are not intended to limit the present disclosure to the particular form disclosed but rather the present disclosure is to cover all modifications, equivalents and alternatives falling within the scope of the present disclosure.

FIG. 1 illustrates schematically a part of an interior 1 of a vehicle according to one example. In this example a dashboard of the vehicle is illustrated in the drawing, but it will be appreciated that other parts of the vehicle that include an in-vehicle apparatus may also be used. For example, an in-vehicle apparatus may be installed in a head rest of either or both of fronts seats of the vehicle, viewable by passengers seated in rear seats of the vehicle.

The part of the interior 1 of the vehicle includes an in-vehicle apparatus 2. The in-vehicle apparatus 2 in this example is a display device capable of displaying content received from a mobile device 4 connected to the in-vehicle apparatus 2. The in-vehicle apparatus 2 provided by the display device may also include other functionality, for example a satellite navigation unit known as a sat-nay, entertainment controls (e.g., volume, track, skip, pause), or vehicle system control. The in-vehicle apparatus 2 includes a display unit 10 for displaying the content received from a connected device 4, and if the apparatus includes such functionality, displaying information regarding route planning and information related to the vehicle. In this example, the display unit 10 is provided by a liquid crystal display known as LCD, but other display technologies may be used, e.g., a light-emitting diode display or an electroluminescent display.

FIG. 1 also illustrates the mobile device 4 that is in communication with the in-vehicle apparatus 2. The mobile device 4 in this example is a mobile telephone or a mobile phone. However, the mobile device 4 may also include a portable music player or other portable or mobile electronic device capable of interfacing with the in-vehicle apparatus 2. The communication between the in-vehicle apparatus 2 and the mobile device 4 is two-way.

The mobile device 4 in this example is not part of the vehicle or the in-vehicle apparatus 2. The mobile device 4 is in communication with the in-vehicle apparatus 2 using a wired or wireless connection. For example, the mobile device 4 may be connected to the in-vehicle apparatus 2 using a USB connection. Further examples, include wired or wireless connections using Bluetooth, IEEE1394, IEEE802.11 or ZigBee, but the connection is not limited to these examples. The mobile device 4 includes a display unit 24, which includes a display screen 6 and an input portion 8. The input portion 8 may be provided by a keypad. It will be appreciated that the input portion 8 may be part of the display screen 6 in the form of a touch screen. The display screen 6 of the mobile device 4 is provided by an LCD, but other display technologies may be used, e.g., a light-emitting diode display or an electroluminescent display.

Figure 2:
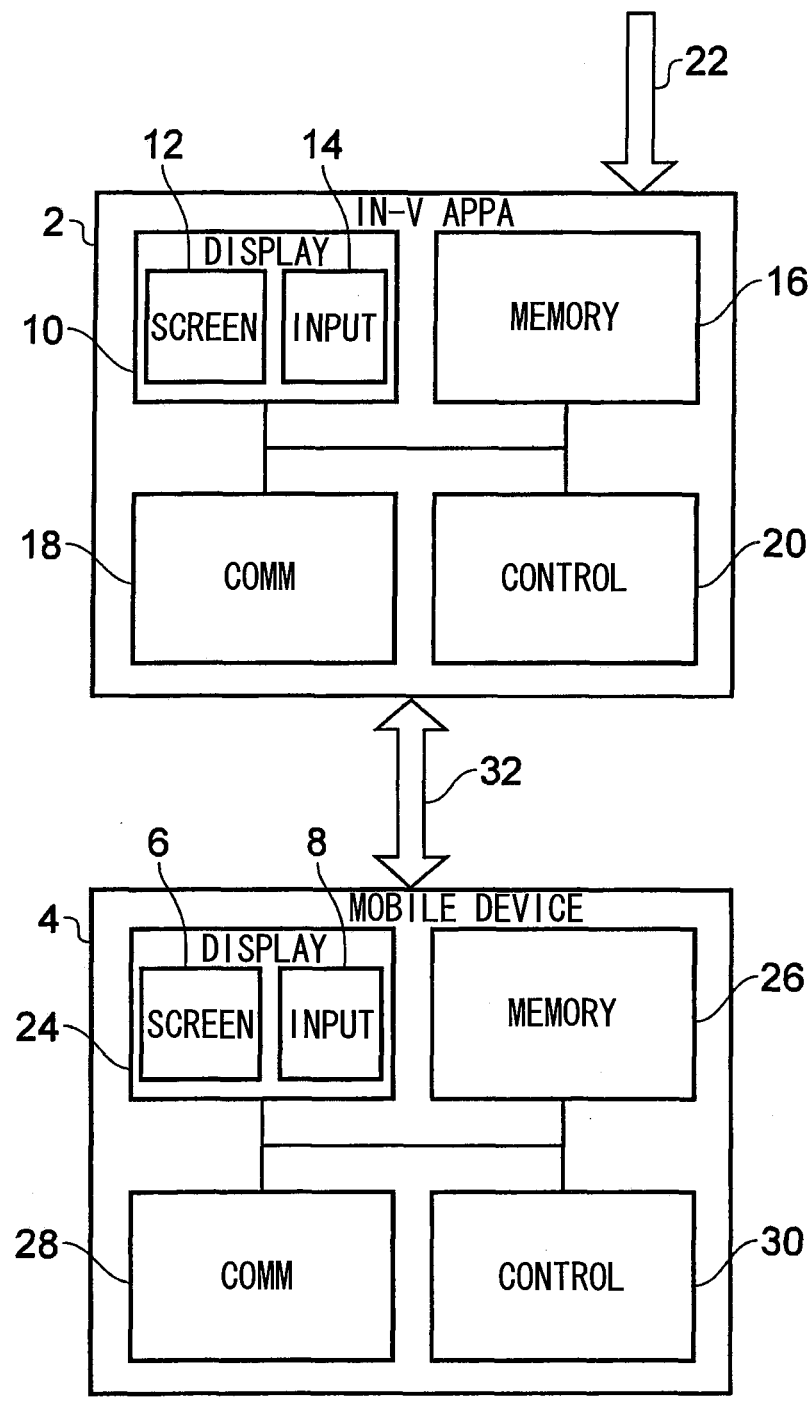
FIG. 2 is a block diagram of the in-vehicle apparatus and the mobile device according to the embodiment of the present disclosure.

FIG. 2 illustrates schematically the in-vehicle apparatus (IN-V APPA) 2 and the mobile device 4. The in-vehicle apparatus 2 includes the display unit (DISPLAY) 10, a memory 16, a communication unit (COMM) 18 and a control unit (CONTROL) 20. The communication unit 18 may also be referred to as a transceiver for transferring data to and from the mobile device 4. The memory 16 is in the form of a ROM and RAM, but may be any form of solid state memory or drive. For example, the memory may be in the form of a removable flash drive or a hard-disc drive. The display unit 10 includes a display screen (SCREEN) 12, for example an LCD, and an input portion (INPUT) 14. The input portion 14 may be provided by, for example, a touch-screen or a touch panel in the form of a capacitive touch panel, for example, that is overlaid on the display screen 12. The touch screen may also be provided using alternative technologies, for example, resistive or infrared.

It will be appreciated that a control panel may be used that is separate from the display unit 10, for example, the in-vehicle apparatus 2 may include the control panel that is separate from the display unit 10 and includes a number of push buttons allowing user control of the in-vehicle apparatus 2. The input unit of the control panel may also include a rotary type control, jockey-wheel or other directional control device.

The communication unit 18 includes hardware and software to allow the in-vehicle apparatus 2 to communicate with the mobile device 4. In this example, the communication unit 18 uses a wired connection using a USB connection on each of the in-vehicle apparatus 2 and the mobile device 4. It will be appreciated that when the mobile device 4 is connected to the in-vehicle apparatus 2 using a USB connection on the in-vehicle apparatus 2, a communication channel 32 is established using known techniques. Any software used by the communication unit 18 is stored within a ROM (not shown) of the communication unit 18, but may also be stored in a ROM part of the memory 16 of the in-vehicle apparatus 2. As described above, the communication between the mobile device 4 and the in-vehicle apparatus 2 may also be implemented using other forms of wired or wireless connection.

The control unit 20 provides the control of the elements of the in-vehicle apparatus 2 and is in communication with the memory 16, the display unit 10 and the communication unit 18. The control unit 20 also receives vehicle related information from a communication bus 22 of the vehicle, e.g., vehicle speed information, vehicle temperature data or tachometer data.

The mobile device 4 includes the display unit (DISPLAY) 24, a memory 26, a communication unit (COMM) 28, and a control unit (CONTROL) 30. The communication unit 28 may be provided by a transceiver. The memory 26 is in the form of a ROM and RAM, but may be any form of solid state memory or drive. For example, the memory may be in the form of a removable flash drive or a hard-disc drive. The display unit 24 includes the display screen (SCREEN) 6, for example an LCD, and the input portion (INPUT) 8 in the form of a capacitive touch panel, for example. The input portion 8 may be overlaid on the display screen 6 or may be arranged on a separate part of the mobile device 4. When the input portion 8 is provided by the touch panel, the touch panel may also be provided using alternative technologies, for example, resistive or infrared.

It will be appreciated that control of the mobile device 4 may be affected using a separate control panel including a number of push buttons allowing user control of the mobile device 4. The input unit of the control panel may also include a rotary type control, jockey-wheel or other directional control device.

The communication unit 28 includes hardware and software to allow the mobile device 4 to communicate with the in-vehicle apparatus 2. In this example, the communication unit 28 uses USB to communicate with the in-vehicle apparatus 2. Any software used by the communication unit 28 is stored within a ROM (not shown) of the communication unit 28, but may also be stored in the ROM part of the memory 26 of the mobile device 4. As described above, the communication between the mobile device 4 and the in-vehicle apparatus 2 may also be implemented using other forms of wired or wireless connection.

The mobile device 4 in this example is a mobile phone. However, it may also be a mobile tablet pc, or music device, for example, which may or may not include a telephone capability. Nevertheless, it will be appreciated that those aspects of the mobile device that are not related to the present teachings are not described, but it will be understood that these are implemented using known techniques.

The control unit 30 provides the control of the elements of the mobile device 4 and is in communication with the memory 26, the display unit 24 and the communication unit 30. For example, the control unit 30 may receive a control signal from a user on from the input portion 8 to launch an application program. Hereinafter, an application program is also referred to as an application for short. The applications may be any application executable by the mobile device 4 and may include one or more of an audio playback application, a video playback application, an information presentation application, a game, an information recordable and/or retrieval application (such as an name and address application), and a system application (such as a terminal mode application). The control unit 30 will control the display screen 6 to display the launched application.

As previously described, the mobile device 4 and the in-vehicle apparatus 2 communicates via the communication channel 32. More specifically, the communication unit 28 of the mobile device 4 communicates with the communication unit 18 of the in-vehicle apparatus 2. According to one example the in-vehicle apparatus 2 receives data from the mobile device 4 related to data displayed on the display screen 6 of the mobile device 4. Furthermore, control signals from the control unit 20 of the in-vehicle apparatus 2 are transmitted to and received from the control unit 30 of the mobile device 4 via the established communication channel 32.

In this example, a Virtual Network Computing (VNC) type approach is used to allow the in-vehicle apparatus 2 to transmit the control signals via the communication channel 32 to the mobile device 4 and to allow the display or parts of the mobile device 4 to be reproduced on the display screen 12 of the in-vehicle apparatus 2. It will be appreciated that other protocols may be used instead of VNC such as X Window System (or X11) or a terminal mode system such as MirrorLink™.

If the mobile device 4 includes a map or route planning application, the user may wish to display this on the display screen 12 of the in-vehicle apparatus 2. A further example may be a video player application available on the mobile device 4 that the user may wish to be displayed on the display screen 12 of the in-vehicle apparatus 2. By way of example it is assumed that when a route planner application and a video player application are executed on the mobile device 4, the route planner application and the video player application can be displayed on the screen 12 of the in-vehicle apparatus 2.

Figure 3:
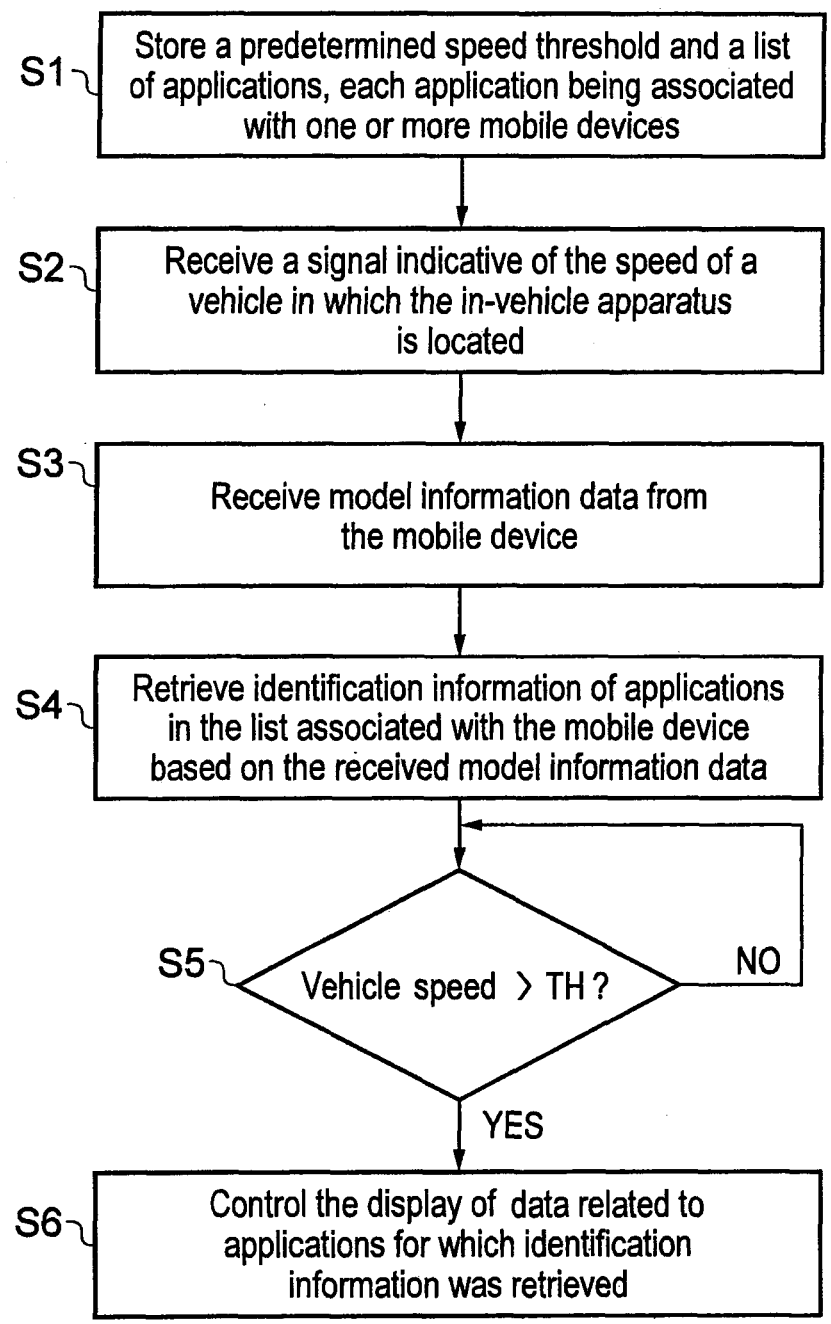
FIG. 3 is a flowchart showing an example process performed by the in-vehicle apparatus.

FIG. 3 is a flow chart of a process performed by the control unit 20 of the in-vehicle apparatus 2 to control the display of applications executed on the mobile device 4 on the display screen 12 of the in-vehicle apparatus 2. Before the process shown in FIG. 3 is performed, it will be appreciated the mobile device 4 and the in-vehicle apparatus 2 will establish the communication channel 32. This is performed in a typical manner known to those skilled in the art. For example, the control unit 30 of the mobile device 4 will search for devices in the vicinity and prompt a user to select a device to connect to. The user selects the in-vehicle apparatus 2. Then, a two-way communication channel between the mobile device 4 and the in-vehicle apparatus 2 is established. During the process of establishing a connection device, identifications are transferred between the two devices. These identifications are stored in the respective memories 16, 26 of the in-vehicle apparatus 2 and the mobile device 4.

In S1, a list or other store of records containing the names of applications executable on mobile devices 4 is stored as an application list. The application list is also referred to as an application record. Each application is associated with one or more mobile devices. For example, a first entry in the list is for an application called Route planner, which is associated with a first mobile device and a second mobile device. Further, a second entry in the list is for an application called Video player and is associated with the first mobile device and a third mobile device. Hereinafter, the second mobile device and the third mobile device are also referred to as different mobile devices. The list of application names is stored in the memory 16 of the in-vehicle apparatus 2. The list may be pre-stored when the in-vehicle apparatus 2 is initially installed in a vehicle, or may be uploaded by a user, and may also be uploaded/updated via a mobile device 4 or other means, such as from a storage device compatible with the in-vehicle apparatus 2.

In a separate list or other store of records a predetermined speed threshold is stored. Hereinafter, the predetermined speed threshold is also referred to as a speed threshold. This separate list is in the present example stored in a different location of the memory 16 from the application list. The storage of the speed threshold is also performed in S1. S1 is preferably performed before a mobile device 4 is connected or paired with the in-vehicle apparatus 2. However, the application list and speed threshold may be uploaded to the in-vehicle apparatus 2 after a mobile device 4 has been paired with the in-vehicle apparatus 2. If the speed threshold is stored in a different location from the application list, it may be easier to update with different values. In some examples multiple speed thresholds, each of which is associated with one or more applications, need to be uploaded or stored in the in-vehicle apparatus 2. Thus, different applications may be controlled according to differing speed thresholds. For example an application that is considered to have a relatively low driver distraction impact may have a higher speed threshold than an application that is considered to have a relatively high driver distraction impact.

In S2, the in-vehicle apparatus 2 receives a signal indicative of a speed of the vehicle in which the mobile device 4 is located. The signal indicative of the speed of the vehicle is received from the communication bus 22 of the vehicle, and also contains data related to the vehicle. In this example, speed related data is transmitted from a central processing unit (CPU) of the vehicle. The CPU of the vehicle will preferably receive the speed related data from a sensor mounted on the vehicle which can be relayed to the in-vehicle apparatus 2. Furthermore, in this example the in-vehicle apparatus 2 transits a request to the CPU of the vehicle to obtain the indication of the speed of the vehicle. Hereinafter, the speed of the vehicle is also referred to as a vehicle speed. Alternatively, the in-vehicle apparatus 2 may be configured to periodically receive an indication of the vehicle speed from the CPU of the vehicle.

In S3, the in-vehicle apparatus 2 receives data regarding model information of the mobile device 4 that is paired with the in-vehicle apparatus 2. The model information of the mobile device 4 may be transmitted from the mobile device 4 when the communication channel 32 between the mobile device 4 and the in-vehicle apparatus 2 is established. This model information is then stored in the memory 16 of the in-vehicle apparatus 2 for later retrieval, such that in S3, the model information of the mobile device 4 is retrieved from the memory 16.

In S4, the in-vehicle apparatus 2 accesses the memory 16 to retrieve the application list. In particular, the in-vehicle apparatus 2 retrieves the names or identification information of those applications that appear in the application list that are associated with the one or more mobile devices 4 connected to the in-vehicle apparatus 2. For example, when the first mobile device is connected to the in-vehicle apparatus 2 as the mobile device 4, the names or identification information Route planner and Video player are retrieved from the application list stored in the memory 16 of the in-vehicle apparatus 2. When the second mobile device is connected to the in-vehicle apparatus 2 as the mobile device 4, only the application Route planner is retrieved from the application list stored in the memory 16 of the in-vehicle apparatus 2.

In S5, the in-vehicle apparatus 2 periodically receives the speed related data of the vehicle from the communication bus 22 of the vehicle and compares the received indication of the vehicle speed to the stored predetermined speed threshold (TH), which is retrieved from the memory 16 when the comparison is performed. If in S5 it is determined that the indication of the vehicle speed is not greater than the speed threshold, the process returns to the beginning of S5 and continues to compare the speed threshold to the indication of the vehicle speed. If it is determined in S5 that the indication of the vehicle speed exceeds the retrieved speed threshold (TH), the process moves to S6.

In S6, the control unit 20 of the in-vehicle apparatus 2 controls the display of applications on the display screen 12 of the in-vehicle apparatus 2. The control performed by the control unit 20 may be to permit the display of only those applications whose identification information was retrieved from the memory 16 or may be to prohibit the display of those applications whose identification information was retrieved from the memory 16.

For example, if the first mobile device is connected to the in-vehicle apparatus 2 as the mobile device 4, application names or identification information Route planner and Video player are retrieved form the memory 16 in S4. When it is determined that the indication of the vehicle speed exceeds the stored speed threshold, the applications Route planner and Video player are prohibited from being displayed on the display screen 12 of the in-vehicles apparatus 2. Alternatively, when it is determined that the indication of the vehicle speed exceeds the stored speed threshold, applications Route planner and Video player running on the mobile device are the only applications that can be displayed on the display screen 12 of the in-vehicles apparatus 2. That is to say that all other applications are prohibited from being displayed except for Route planner and Video player running when the indication of the vehicle speed exceeds the speed threshold.

The following will describe a control of the display of the applications on the in-vehicle apparatus 2. In this example, when it is determined that the speed of the vehicle exceeds the speed threshold, the control unit 20 transmits a control signal to the mobile device 4 to command the mobile device 4 to cease or prevent the mobile device 4 from transmitting display data related to the application whose identification information appears in the list associated with the mobile device 4. Alternatively, the control signal may command the mobile device 4 to only transmit display data of those applications whose identification information appears in the list when the indication of the vehicle speed exceeds the speed threshold. It will be appreciated that the display data will only be transmitted or prevented from being transmitted from the mobile device 4 when the identified application is running on the mobile device 4.

Thus it is possible to control the display of predetermined applications based on the mobile device according to the speed of the vehicle. In the above-described example, the predetermined applications are the Route Planner and the Video Player. That is, the in-vehicle apparatus 2 controls (prohibits or permits) a display of the data related to the predetermined application on the display screen 12 of the in-vehicle apparatus 2 when the speed of the vehicle exceeds the predetermined speed threshold.

In another example, the control unit 20 of the in-vehicle apparatus 2 does not transmit control signals to the mobile device 4. Instead, the control unit 20 checks received displayed data from the mobile device 4 to determine which application the display data is related to. For example, the control unit 20 checks the display data to determine the name or identification of the application contained within the data. Once the control unit 20 has discovered the name of the application from the display data the process of determining whether or not to display the display data is performed. In this example, all display data that is transmitted from the mobile device 4 is checked to determine the name of the application that is contained with the display data.

The predetermined speed threshold that is stored in the memory 16 of the in-vehicle apparatus 2 may also be associated with one or more mobile devices 4. Furthermore, the memory 16 may store a plurality of predetermined speed thresholds, which are stored for each mobile device 4 when more than one mobile devices 4 are connected to the in-vehicle apparatus 2.

In another example the in-vehicle apparatus 2 includes a speed detection unit (not shown). For example, the speed detection unit may be in the form of an application executed on the in-vehicle apparatus 2 that uses the vehicles movement based on GPS data to determine the vehicle speed.

While the present disclosure is described herein by way of example for several embodiments and illustrative drawings, those skilled in the art will recognize that the present disclosure is not limited to the embodiments or drawings described. It should be understood, that the drawings and detailed description thereto are not intended to limit the present disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word may is used in a permissive sense (i.e. meaning might) rather than the mandatory sense (i.e., meaning must). Similarly, the words include, including, and includes mean including, but not limited to.

What is claimed is:

1. An in-vehicle apparatus, which is located in a vehicle and is communicably connected to a mobile device, comprising:
   a display screen configured to display data related to a plurality of applications of the mobile device in communication with the mobile device;
   a memory configured to store an application record in which an identification information of a predetermined application is stored associated with the mobile device, the predetermined application being one of the applications of the mobile device;
   a communication unit operable to receive, from the mobile device, a model information data of the mobile device; and
   a control unit operable to:
   i) receive a signal indicative of a speed of the vehicle;
   ii) retrieve, from the memory, the identification information of the predetermined application included in the application record based on the model information data received from the mobile device; and
   iii) control a display of the data related to the predetermined application on the display screen when the speed of the vehicle exceeds a predetermined speed threshold, the predetermined application being identified by the identification information retrieved from the memory.

2. The in-vehicle apparatus according to claim 1, wherein a different mobile device is communicably connected to the in-vehicle apparatus, and
   wherein the predetermined application is associated with the mobile device or is associated with both the mobile device and the different mobile device.

3. The in-vehicle apparatus according to claim 2, wherein the memory stores the predetermined speed threshold for the mobile device and stores a different speed threshold for the different mobile device.

4. The in-vehicle apparatus according to claim 2, wherein the memory stores the predetermined speed threshold for the mobile device and the different mobile device.

5. The in-vehicle apparatus according to claim 1, wherein a different predetermined application, which is one of the applications of the mobile device, is stored in the application record in addition to the predetermined application.

6. The in-vehicle apparatus according to claim 5, wherein the predetermined application included in the application record is associated with the predetermined speed threshold, and
   wherein the different predetermined application included in the application record is associated with a different predetermined speed threshold.

7. The in-vehicle apparatus according to claim 1, wherein the memory stores the predetermined speed threshold.

8. The in-vehicle apparatus according to claim 7, wherein the predetermined speed threshold and the application record are separately stored in different areas of the memory.

9. The in-vehicle apparatus according to claim 1, wherein the control unit permits the display of the data related to the predetermined application on the display screen when the speed of the vehicle exceeds the predetermined speed threshold.

10. The in-vehicle apparatus according to claim 1,
wherein the control unit prohibits the display of the data related to the predetermined application on the display screen when the speed of the vehicle exceeds the predetermined speed threshold.

11. The in-vehicle apparatus according to claim 1,
wherein the control unit is operable to generate a control signal for the mobile device, and
wherein the control signal includes an instruction for the mobile device to control a transmission of the data related to the predetermined application from the mobile device to the in-vehicle apparatus.

12. The in-vehicle apparatus according to claim 11,
wherein the communication unit is operable to transmit the control signal to the mobile device and receive the data related to the predetermined application from the mobile device.

13. The in-vehicle apparatus according to claim 1,
wherein the data, which is related to the predetermined application and is to be displayed on the display screen, is referred to as display data,
wherein the display data further includes the identification information of the predetermined application, and
wherein the control unit is operable to check the display data received from the mobile device to determine the identification information of the predetermined application.

14. The in-vehicle apparatus according to claim 1, further comprising
a speed detection unit operable to detect the speed of the vehicle.

15. The in-vehicle apparatus according to claim 1,
wherein the predetermined speed threshold is associated with the mobile device.

16. The in-vehicle apparatus according to claim 1,
wherein the predetermined application is a terminal mode application.

17. A vehicle comprising the in-vehicle apparatus according to claim 1.

18. A method for an in-vehicle apparatus comprising:
storing a record of a plurality of applications as an application record, each of the applications being associated with one or more mobile devices;
receiving a signal indicative of a speed of a vehicle in which the in-vehicle apparatus is located;
receiving model information data from the mobile device;
retrieving identification information for at least one of the applications included in the application record associated with the mobile device based on the model information data received from the mobile device; and
controlling a display of data on a display screen of the in-vehicle apparatus when the speed of the vehicle exceeds a predetermined speed threshold, the data to be displayed on the display screen of the in-vehicle apparatus being related to the at least one of the applications, which is identified by the identification information.

19. The method according to claim 18, further comprising storing the predetermined speed threshold.

20. The method according to claim 19,
wherein the predetermined speed threshold and the application record are stored separately in different areas of a memory of the in-vehicle apparatus.

21. The method according to claim 18,
wherein a display of the at least one of the applications identified by the identification information on the display screen is allowed when the speed of the vehicle exceeds the predetermined speed threshold.

22. The method according to claim 18,
wherein a display of the at least one of the applications identified by the identification information on the display screen is prohibited when the speed of the vehicle exceeds the predetermined speed threshold.

23. The method according to claim 18, further comprising generating a control signal for the mobile device, the control signal including instructions for the mobile device to control a transmission of the data related to the at least one of the applications from the mobile device to the in-vehicle apparatus.

24. The method according to claim 23, further comprising transmitting the control signal to the mobile device and receiving the data related to the at least one of the applications from the mobile device.

25. The method according to claim 18, further comprising interrogating the data, which is related to the at least one of the applications and is received from the mobile device, to determine the identification information of the at least one of the applications included in the data.

26. The method according to claim 18, further comprising detecting the speed of the vehicle.

27. The method according to claim 18,
wherein the predetermined speed threshold is associated with the mobile device.

28. The method according to claim 18,
wherein, when a plurality of predetermined speed thresholds are stored, each of the predetermined speed thresholds is set for each of the mobile devices or is set for all of the mobile devices.

29. The method according to claim 18,
wherein the at least one of the applications includes a terminal mode application.

30. The method according to claim 18,
wherein the controlling of the display of the data in relation to different applications identified is based upon respective different predetermined speed thresholds.

31. A computer program product comprising processor implementable instructions for causing a programmable device to carry out the method according to claim 18.

* * * * *